United States Patent
Iuppa et al.

(10) Patent No.: US 7,155,158 B1
(45) Date of Patent: Dec. 26, 2006

(54) METHOD AND APPARATUS FOR ADVANCED LEADERSHIP TRAINING SIMULATION AND GAMING APPLICATIONS

(75) Inventors: Nicholas V. Iuppa, Belmont, CA (US); Andrew S. Gordon, Marina Del Rey, CA (US)

(73) Assignees: University of Southern California, Los Angeles, CA (US); Altsim, Inc., Hollywood, CA (US)

( * ) Notice: Subject to any disclaimer, the term of this patent is extended or adjusted under 35 U.S.C. 154(b) by 287 days.

(21) Appl. No.: 10/356,462

(22) Filed: Jan. 31, 2003

Related U.S. Application Data

(63) Continuation-in-part of application No. 10/036,107, filed on Nov. 9, 2001.

(51) Int. Cl.
  *G09B 7/00* (2006.01)

(52) U.S. Cl. .......................... 434/350; 434/236; 463/1; 463/9; 463/42

(58) Field of Classification Search ................ 434/350, 434/236; 463/1, 9, 42
See application file for complete search history.

(56) References Cited

U.S. PATENT DOCUMENTS

| | | | |
|---|---|---|---|
| 4,591,248 A | 5/1986 | Freeman | |
| 5,310,349 A | 5/1994 | Daniels et al. | |
| 5,441,415 A | 8/1995 | Lee et al. | |
| 5,465,384 A | 11/1995 | Bejan et al. | |
| 5,544,305 A | 8/1996 | Ohmaye et al. | |
| 5,604,855 A | 2/1997 | Crawford | |
| 5,676,551 A * | 10/1997 | Knight et al. ................ | 434/236 |
| 5,701,400 A | 12/1997 | Amado | |
| 5,721,845 A | 2/1998 | James et al. | |
| 5,727,950 A | 3/1998 | Cook et al. | |
| 5,737,527 A | 4/1998 | Shiels et al. | |
| 5,805,784 A * | 9/1998 | Crawford ..................... | 345/473 |
| 5,813,863 A * | 9/1998 | Sloane et al. ................ | 434/236 |
| 5,827,070 A | 10/1998 | Kershaw et al. | |
| 5,892,507 A * | 4/1999 | Moorby et al. .......... | 715/500.1 |
| 5,918,217 A | 6/1999 | Maggioncalda et al. | |
| 5,963,953 A | 10/1999 | Cram et al. | |
| 5,987,443 A | 11/1999 | Nichols et al. | |
| 5,999,182 A | 12/1999 | Etchemendy et al. | |
| 6,029,156 A | 2/2000 | Lannert et al. | |
| 6,032,141 A | 2/2000 | O'Connor et al. | |
| 6,049,332 A | 4/2000 | Boetje et al. | |
| 6,074,213 A | 6/2000 | Hon | |
| 6,105,046 A | 8/2000 | Greenfield et al. | |
| 6,125,358 A | 9/2000 | Hubbell et al. | |

(Continued)

OTHER PUBLICATIONS

Lippman, J., "As Hollywood Casts About For A War Role, Virtual Reality Is Star," The Wall Street Journal, Nov. 9, 2001.

(Continued)

*Primary Examiner*—Chanda L. Harris
(74) *Attorney, Agent, or Firm*—Reed Smith LLP

(57) ABSTRACT

A method and apparatus advanced leadership training simulation wherein the simulation teaches skills in leadership and related topics through an Internet-based distance-learning architecture. The distance-learning features link trainees at remote locations into a single collaborative experience via computer networks. Instructional storylines are created and programmed into a computer and then delivered as a simulated but realistic story to one or more participants. The participants' reactions are monitored and compared with expected results. The storyline may be altered in response to the participants' responses and synthetic characters may be generated to act as automated participants or coaches. Constructive feedback is provided to the participants during or after the simulation.

9 Claims, 6 Drawing Sheets

U.S. PATENT DOCUMENTS

| | | | |
|---|---|---|---|
| 6,134,539 A | 10/2000 | O'Connor et al. | |
| 6,171,109 B1 | 1/2001 | Ohsuga | |
| 6,296,487 B1 | 10/2001 | Lotecka | |
| 6,308,187 B1 | 10/2001 | DeStefano | |
| 6,324,678 B1 | 11/2001 | Dangelo et al. | |
| 6,408,263 B1 | 6/2002 | Summers | |
| 6,421,667 B1 | 7/2002 | Codd et al. | |
| 6,427,063 B1 | 7/2002 | Cook et al. | |
| 6,449,603 B1 | 9/2002 | Hunter | |
| 6,470,482 B1 | 10/2002 | Rostoker et al. | |
| 6,544,040 B1 | 4/2003 | Brelis et al. | |
| 6,561,811 B1* | 5/2003 | Rapoza et al. | 434/236 |
| 6,622,003 B1 | 9/2003 | Denious et al. | |
| 6,709,335 B1* | 3/2004 | Bates et al. | 463/42 |
| 6,736,642 B1* | 5/2004 | Bajer et al. | 434/236 |
| 2001/0049087 A1 | 12/2001 | Hale | |
| 2002/0059376 A1 | 5/2002 | Schwartz | |
| 2002/0072040 A1 | 6/2002 | Bajer et al. | |
| 2002/0107721 A1 | 8/2002 | Darwent et al. | |
| 2002/0124048 A1 | 9/2002 | Zhou | |
| 2002/0127525 A1 | 9/2002 | Arington et al. | |
| 2002/0146667 A1 | 10/2002 | Dowdell et al. | |
| 2002/0182570 A1 | 12/2002 | Croteau et al. | |
| 2003/0008270 A1 | 1/2003 | Fleishman | |
| 2003/0014400 A1 | 1/2003 | Siegel | |
| 2003/0031986 A1 | 2/2003 | Siddle | |
| 2003/0048289 A1 | 3/2003 | Vronay | |
| 2003/0060910 A1 | 3/2003 | Williams et al. | |
| 2004/0095378 A1* | 5/2004 | Vigue et al. | 345/723 |
| 2004/0103148 A1* | 5/2004 | Aldrich | 709/204 |

OTHER PUBLICATIONS

Iuppa, N., "Interactive Design For New Media And The Web,", Butterworth-Heinemann, 2001, pp. 1-250.

Szilas, N., "A New Approach To Interactive Drama: From Intelligent Characters To An Intelligent Virtual Narrator," 2001 AAAI Spring Symposium On Artifiical Intelligence and Interactive Entertainment, Mar. 26-28, 2001, Stanford CA, Menlo Park, AAAI Press.

Young, R. M., An Overview Of the Mimesis Architecture: Integrating Intelligent Narrative Control Into An Existing Gaming Environment, 2001 AAAI Spring Symposium On Artificial Intelligence and Interactive Entertainment, Mar. 26-28, 2001, Stanford CA, Menlo Park, AAAI Press.

Paiva, A., et al. "Heroes, villains, magicians, . . . : Dramatis Personae in a Virtual Story Creation Environment," IUI '01, Jan. 14-17, 2001, 129-136.

Swartout, W. et al. "Toward the Holodeck: Integrating Graphics, Sound, Character and Story," Proceedings of the 5th International Confrence on Autonomous Agents, Montreal, Canada, Jun. 2001.

Mateas, M., A Neo-Aristotelian Theory Of Interactive Drama, 2000 AAAI Spring Symposium On Artificial Intelligence and Interactive Entertainment, Stanford CA, Menlo Park, AAAI Press.

Magerko, B., "A Proposal For An Interactive Drama Architecture," copyright 2000, American Association for Artificial Intelligence.

Marsella, S. et al. "Interactive Pedagogical Drama." Proceedings of the 4th Intl. Conf. on Autonomous Agents, Barcelona, Spain. ACM Press, New York, 2000.

Mateas, M. et al. "Towards Integrating Plot and Character for Interactive Drama.", The Human in the Loop, AAAI Symposium, Nov. 2000.

Young, R. M., Notes On The Use Of Plan Structures In The Creation Of Interactive Plot, 1999 AAAI Spring Symposium On Narrative Intelligence, Nov. 5-7, 1999, Menlo Park, AAAI Press.

Aylett, R., Narrative In Virtual Environments—Towards Emergent Narrative, 1999 AAAI Spring Symposium On Narrative Intelligence, Nov. 5-7, 1999, Menlo Park, AAAI Press.

Dhir, A., "OriginalSim Signs Collaborative Agreement With US Air Force Research Labs For DMT Research," Press Release, Apr. 14, 1999.

"Phase Two Story Drive Engine Project," Prepared by Paramount Digital Entertainment for U.S. Department of Defense, Mar. 1, 1999.

Bailey, P. "Searching for storiness: Story-generation from a reader's perspective." *The 1999 AAAI Fall Symposium on Narrative Intelligence*, AAAI Press (1999).

Machado, I. et al. "Once upon a time." *The 1999 AAAI Fall Symposium on Narrative Intelligence*, AAAI Press (1999).

Mott, B. et al., "Towards narrative-centered learning environments." *The 1999 AAAI Fall Symposium on Narrative Intelligence*, AAAI Press (1999).

Szilas, N. "Interactive drama on computer beyond linear narrative." *The 1999 AAAI Fall Symposium on Narrative Intelligence*, AAAI Press (1999).

Young, M. "Notes on the use of pain structures in the creation of interactive plot." *The 1999 AAAI Fall Symposium on Narrative Intelligence*, AAAI Press (1999).

"StoryDrive Engine Phase One Feasibility Study," Prepared by Paramount Digital Entertainment for U.S. Department of Defense DMSO STRICOM, May 6, 1998.

Lindheim, R. et al., "The StoryDrive Engine," Presentation Feb. 8-9, 1997, Los Angeles, CA, Paramount Digital Entertainment, University of Southern California.

Ferren, B., "Some Brief Observations On The Future Of Army Simulation," Excerpt, 1997 Summer Study on Battlefield Visualization.

Cleave, J. "A storyline-based approach to developing management role-playing simulations." Northwestern University Ph.D. dissertation (1997).

Weyhrauch, P. "Guiding Interactive Drama." Ph.D. Thesis, Technical Report CMU-CS-97-109, School of Computer Science, Carnegie Mellon University (1997) Abstract only.

Zyda, M., "*Modeling and Simulation: Linking Entertainment & Defense*", Zyda, Michael, Jerry Sheehan (eds.), National Academy Press, Wash. DC, Mar. 1997.

Murray, Janet H., "Hamlet on the Holodek: The Future of Narrative in Cyberspace." MIT Press, Cambridge, Mass., 1997.

Loyall, A. Bryan. "Believable Agents: Building Interactive Personalities," Ph.D. Thesis, Technical report CMU-CS-97-123, Carnegie Mellon University, 1997.

Murtaugh, M., "The Automatist Storytelling System, Putting The Editor's Knowledge In Software", Master's Thesis, MIT Media Lab, Massachusetts Institute of Technology, 1996.

Hayes-Roth, Barbara et al. "Acting in Character," Stanford Knowledge Systems Laboratory Report KSL-96-13, 1996.

Reilly, W. Scott Neal. "Believable Social and Emotional Agents," Technical Report CMU-CS-96-138, School of Computer Science, Carnegie Mellon University, 1996.

Jona, M. "Representing and applying teaching strategies in computer-based learning-by-doing tutors." Northwestern University Ph.D. dissertation. (1995).

Blumberg, Bruce et al. "Multi-Level Direction of Autonomous Creatures for Real-Time Virtual Environments," Proceedings of SIGGRAPH 95, ACM *Computer Graphics*, Aug. 1995.

Schank, R. et al. "The Design of Goal-Based Scenarios." *Journal of the Learning Sciences*, vol. 7 No. 1, pp. 107-132 (1994).

Burke, R. "Representation, storage and retrieval of stories in a social stimulation." Northwestern University Ph.D dissertation (1993).

Kelso, M.T. et al. "Dramatic Presence." Presence, The Journal of Teleoperators and Virtual Environments, MIT Press vol. 2, No. 1, Winter 1993.

Bates, J. "Virtual reality, art and entertainment." Presence, The Journal of Teleoperators and Virtual Environments, MIT Press, vol. 1, No. 1, 133-138 (1992).

Steiner, Karl E. et al. "Graphic StoryWriter: An Interactive Environment for Emergent Storytelling," Proceedings of CHI, 1992 (Monterey, CA, May 3-7, 1992) ACM, New York, 1992, 357-364.

Van Vleck, T., "Multics Timing Channels", May 1990.

Laurel, Brenda. "Toward the Design of a Computer Based Interactive Fantasy System". Ph.D. Thesis, Drama Department, Ohio State University (1986).

Lebowitz, Michael. "Creating Characters in a Story-Telling Universe," Poetics vol. 13, 171-194 (1984).

Lehnert, W. "Plot units: A narrative summarization strategy." *Strategies for Natural Language Processing*, Lawrence Erlbaum Associates, W. Lehnert & M. Ringle (eds.). Hillsdale, NJ:, pp. 345-374 (1982).

Wilensky, R. "Points: A theory of the structure of stories in memory." *Strategies for Natural Language Processing*, Lawrence Erlbaum Associates, W. Lehnert & M. Ringle (eds.). Hillsdale, NJ:, pp. 345-374 (1982).

Meehan, J. R. "The Metanovel: Writing Stories by Computer." Research Report #74, Yale University Department of Computer Science (1976).

Rumelhart, D. "Notes on a schema for stories." *Representing and Understanding: Studies in Cognitive Science*, Academic Press, D. Bobrow & A. Collins (eds.) New York:, pp .211-236 (1975).

Cavassa, M., et al., "Sex, Lies, And Video Games, An Interactive Storytelling Prototype".

Mateas, M. et al., "A Behavior Language For Story-Based Believable Agents".

* cited by examiner

METHOD AND APPARATUS FOR ADVANCED LEADERSHIP TRAINING SIMULATION AND GAMING APPLICATIONS

RELATED APPLICATIONS

The present application is a continuation-in-part of co-pending application Ser. No. 10/036,107 filed Nov. 9, 2001.

This invention was made with Government support under Contract No. DAAD19-99-D-0046 awarded by the United States Army Research Office. The Government has certain rights in this invention.

FIELD OF THE INVENTION

The present invention relates generally to simulation technology, and more particularly to the use of simulation technology to teach leadership skills and related topics through an Internet-based distance-learning architecture, as well as for general consumer gaming use. The distance-learning features link participants at remote locations into a single collaborative experience via computer networks.

BACKGROUND OF THE INVENTION

Recent United States Army studies have indicated that the leadership requirements of the modern war fighting force involve several significant differences from historical experience. Some factors of particular importance to the new generation of military leaders include: (i) the broad variety of people-centered, crisis-based military missions, including counter-terrorism, peacekeeping, operations in urban terrain and the newly emphasized homeland defense, in addition to more conventional warfare; (ii) the command of and dependence on a number of complex weapon, communication and intelligence systems involving advanced technology and specialized tasks; (iii) increased robotic and automated elements present on the battlefield; (iv) distributed forces at all echelons, requiring matching forms of distributed command; and (v) increased emphasis on collaboration in planning and operations.

The demographics of the military leadership corps is changing in several ways. Among the positive features of this change is a high level of sophistication and experience in computer use, including computer communication gaming and data acquisition. This means that modern training simulations should be as motivating and as well-implemented as commercial gaming and information products in order to capture and hold the attention of new military trainees.

There are currently highly developed aircraft, tank and other ground vehicle virtual simulators that realistically present military terrain and the movement of the vehicles within the terrain. Such simulators are very effective at teaching basic operational skills. Networks of virtual simulators, including SIMNET, CCTT and the CATT family, are also available to teach leader coordination of combined arms weapons systems during conventional and MOUT (Military Operations on Urbanized Terrain) warfare in highly lifelike settings. Likewise, constructive simulations such as BBS, Janus, WARSIM, WARSIM 2000 and others are very effective in focusing on the tactical aspects of leadership, i.e., representing movement of material, weapons and personnel particularly for higher echelon maneuvers.

But the same level of developmental effort has not been directed toward equally effective virtual and/or constructive simulators for training leadership and related cognitive skills in scenarios involving substantial human factor challenges. For example, driving a tank does not require the background knowledge, the collaboration or the complex political, diplomatic and psychological judgments that must be made in a difficult, people-centered crisis leadership situation. These judgments depend largely on the actual and estimated behavior of human participants, both friend and foe, in the crisis situation. Unfortunately, the complete modeling of complex human behavior is still beyond current technical capabilities.

As a result, these kinds of leadership skills have routinely been taught in the classroom through lectures and exercises featuring handouts and videotapes. It is possible for a good instructor to build the tension needed to approximate a leadership crisis, but sustaining the tension is difficult to accomplish. Showing the heartbreak of the crisis and the gut-wrenching decisions that must be made is not the strong suit of paper-and-pencil materials or low budget, home-grown videos.

Large classroom exercises such as "Army After Next" and "The Crisis Decision Exercise" at the National Defense University have attempted to give some sense of the leaders' experience through week-long exercises that involve months of planning. These exercises are effective, but they cannot be distributed widely or easily recreated without significant effort. Also, they are not easy to update and modify, and they require a large contingent of designers and developers, as well as on-site operators, to run them after months of planning time.

Story-based simulations, on the other hand, increase participant attention and retention because story-based experiences are more involving and easier to remember. Participants are also able to build judgmental, cognitive and decision-making leadership skills because the simulations provide realistic context in which to model outstanding leadership behavior. Story-based simulations can teach innovation because they are able to challenge participants by providing dramatic encounters with unexpected events and possibilities. Also, story-based simulations overcome the limitations of current constructive and virtual simulations in modeling complex human behavior, which is an increasing aspect of today's leadership challenges.

Crisis-based leadership training requires an awareness of human factors that has been especially difficult to teach through printed materials or the classroom. Giving complexity to an adversary's personality or turning a political confrontation into a battle of wits and will (things that, in fact, represent much of today's military decision making) are easier to discuss than to practice or simulate.

From a computational perspective, the term simulation is commonly used to refer to computational systems that compute subsequent states of a modeled environment by applying some transformational rules to the current model state. For example, weather simulations are computed in this manner—by first describing the current meteorological conditions and then applying knowledge about atmospheric conditions to make a prediction about what will happen in the future. Likewise, the U.S. military uses simulations to make predictions about the outcomes of battles and to give soldiers experience in simulations of potential future battles. The phrase 'constructive simulations' has been used to describe simulations that compute subsequent states by applying transformational rules to the current state. Constructive simulations easily accommodate run-time interaction on the part of human participants. That is, at any moment in the simulation, a trainee can make a decision that changes the state of the modeled world and causes a change that will be propagated by transformational rules, and which may ultimately cause drastic changes in the final outcome of a simulated warfare environment.

The important disadvantage of the use of constructive simulations in military training is the surrender of pedagogical and dramatic control. While it may be desirable to use a simulation to provide pedagogically valuable experiences to trainees, there is little that an instructional designer can do to ensure that certain experiences will occur within the environment. As the trainees have free will and control over the course of the outcome of the simulation, it is impossible to ensure that a specific situation or set of situations will arise once the simulation has begun. The only direct control that instructional designers are given over the simulation is its starting state. Accordingly, there has been an increasing amount of interest in the notion of scenario development, where this has come to mean the specification of initial states for constructive simulations that are likely to lead to pedagogically valuable experiences for trainees.

While well-crafted initial states have a certain utility, particularly when training tactical skills for force-on-force warfare, other types of skill training suffer greatly due to the lack of pedagogical control. This is particularly true of military leadership skill training, where the lessons to be learned by trainees have less to do with timing and positioning of troops, and more to do with complex interrelationships among superior and subordinate officers and enlisted soldiers. In short, it is much easier to ensure that a tactical problem will arise given an initial simulation state than a leadership problem.

Given the autonomy of the actors' characters in a storyline, the story composer is additionally faced with numerous critical problems: how can the composer prevent the actor from taking actions in the imagined world that will move the story in a completely unforeseen direction, or from taking actions that will derail the storyline entirely? How can the composer allow the actors to make critical decisions, devise creative plans, and explore different options without giving up the narrative control that is necessary to deliver a compelling experience? Also, in the case of interactive tutoring systems, how can the composer understand enough about the beliefs and abilities of the actors to create an experience that has some real educational value, i.e., that improves the quality of the decisions that they would make when faced with similar situations in the real world?

Therefore, what is needed is a method and apparatus for advanced leadership training simulation that allows the participants to make real-time critical decisions, devise creative plans and explore different options without relinquishing the composer's narrative control and while allowing the composer to create an experience that improves the quality of leadership decision-making and delivers a compelling experience.

Further, the prior art does not present an adequate approach for simulation-based training experiences. The present invention addresses the problems of pedagogical control in training simulations by exploring a new simulation technology. Rather than relying on constructive simulations, the present invention preferably utilizes a story-driven simulation. Story-driven simulation is a technology that expands on previous research efforts to create interactive experiences in virtual worlds where the outcomes are known and specified in advance by instructional designers (e.g., Cleave, 1997). This approach allows instructional designers to work with storyline writers to create a training experience that is dramatically engaging and includes a specific set of training experiences, but to do so in a manner that allows for a high degree of interactivity than possible using prior art technologies.

The present invention proposes to overcome the above limitations and problems by creating a unique, fully-immersive type of leadership training simulation that provides complex, realistic human interactions through a highly innovative and adaptive story-generation technology. The same technology may also be applied to simulations created for consumer gaming.

SUMMARY OF THE INVENTION

The present application discloses simulation technology that teaches skills in leadership and related topics through an Internet-based distance-learning architecture. The simulations are extremely compelling and memorable because they employ dramatic, people-centered stories and real-time instructional feedback managed by artificial intelligence software tools.

The present invention comprises a story representation system for representing simulation content for use in the training simulation, a story execution system for delivering the simulation content to one or more participants via a computer network, and an experience manager system for monitoring the participants responses to the simulation content, providing feedback to the participants and adjusting a story line to match a change in the story's direction.

The story representation system preferably provides a computer model of a story divided into discrete tasks, actions, goals or contingencies to be achieved by the participants in an engrossing story format. In a presently-preferred embodiment of the present invention, the experience manager monitors the progress of the simulation with respect to the story representation tasks achieved by the participants and reports progress to an instructor interface. An instructor monitoring the instructor interface may intervene in the simulation to adjust the direction of the simulation to maximize the dramatic and educational effectiveness of the simulation. The experience manager preferably provides the instructor with suggestions for accommodations to the storyline to promote the achievement of the goals represented by the story representation system. In a gaming application, such a system would serve the needs of the game manager or game monitor.

The story representation and the experience management systems may employ predicate calculus as a way of representing the past storyline (i.e., the simulation experience of participants up to and including the present moment), the future storyline (i.e., the expected experience of participants, including all alternative storylines that result from choosing alternative experiences at a branch point in the storyline), and the input and media events that are experienced by the participants in the simulation. These data are preferably evaluated to determine if an action of a participant has caused the storyline to progress in a direction that will not result in the achieving of goals. The experience manager preferably utilizes this material to suggest accommodations to the storyline that would push the simulation experience back on track.

The instructor may intervene in the simulation by changing the events of the story, by giving direct instruction to the participants, or by introducing a synthetic character into the simulation to accommodate the simulation in a desired manner or to encourage certain responses from the participants. An automated coaching system may also be used through the experience manager system as part of or instead of the instructor intervention.

The system may also comprise an immersive audio system for enhancing realistic situations and an authoring tools system for developing new simulation scenarios, as well as tools allowing interoperability with other systems and/or simulations.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings wherein like reference characters designate the same or similar elements and wherein:

DETAILED DESCRIPTION OF THE PREFERRED EMBODIMENTS

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

The basic approach of story-driven simulation explored by the present invention involves the use of representations of the expected experience of participating trainees authored using a story representation system. During the execution of the simulation, the actual behavior of participants in the simulation environment is compared with the expected storyline, i.e., the expected training experience. A process of experience management is used to monitor when deviations from expected participant behavior would cause the expected experience to change in unforeseen ways and when appropriate, to apply an experience management strategy to modify the experience in such a manner as to get the story back on track.

The present invention's distance-learning and general gaming technology preferably employs a computer-based architecture that may operate over a computer network such as the Internet to bring together distant participants into a single collaborative activity that simulates a realistic experience. Further, the experience is preferably designed to be fully immersive and engaging in many ways and to have the interactivity of a leading-edge multi-player game in order to appeal to and motivate a new generation of game-savvy participants.

Figure 1:
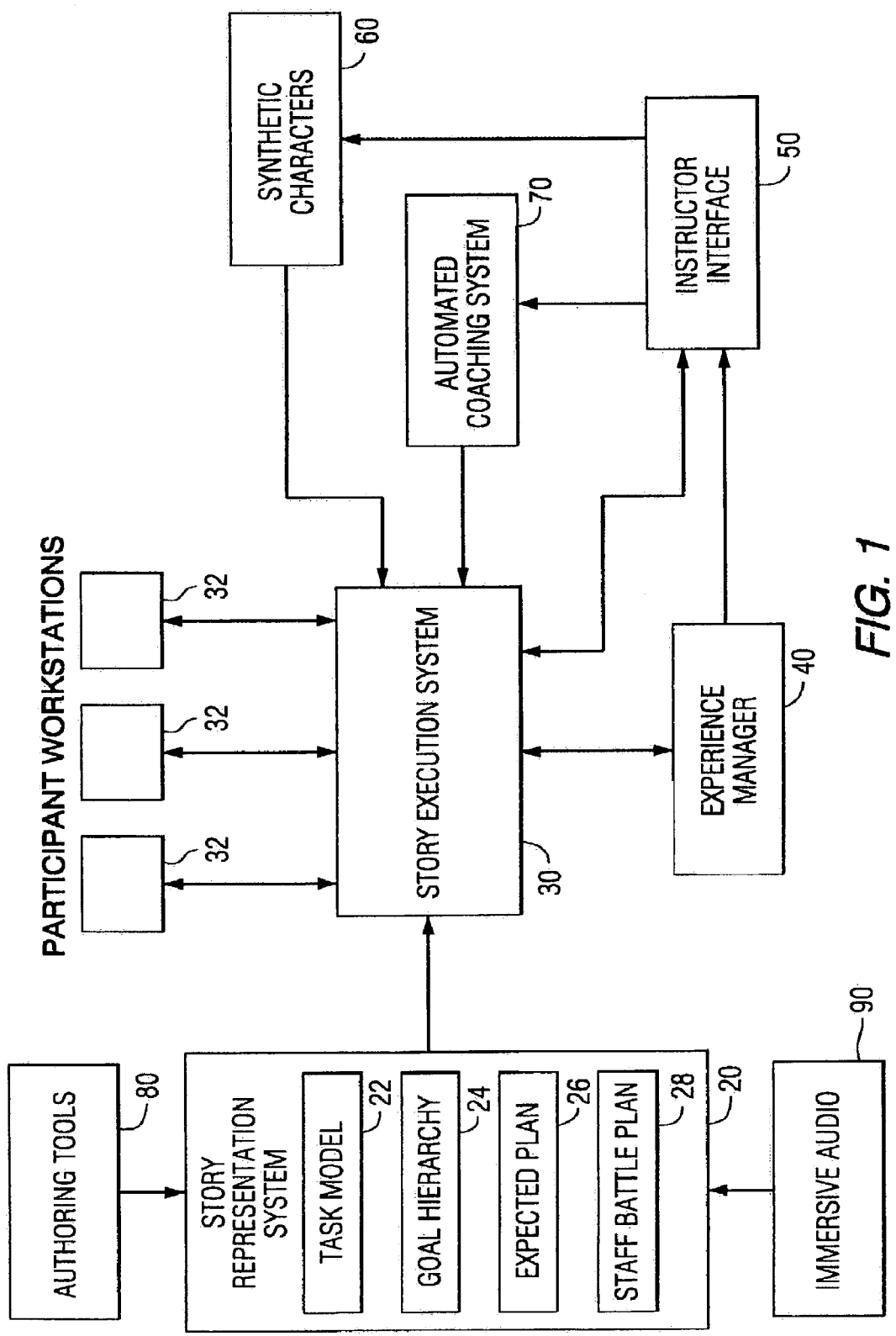
FIG. 1 is a diagram of the main components of a presently-preferred embodiment as disclosed in the present application.

Referring to FIG. 1, the story representation system 20 is preferably a computer program that provides a representation model within the system, i.e., it represents stories, structure and events in the program (akin to a storyboard) and allows integration of media and characters to a series of events and includes a task model 22. Expected participant behavior can be mapped onto the task model 22, which is a list of tasks to be performed and goals to be reached. By turning blocks of expository text into numbered sets of task steps, with preconditions, structured contingencies and action descriptions that are more algorithmic in nature, the task model 22 may be considered a representation of the expected actions of the participants. By comparing the actual actions of a participant to the task model 22 for the participant's ideal real-world counterpart, the participant's progress may be tracked, and deviations warranting pedagogical or dramatic interventions may be flagged.

The task model 22 preferably has three components. First, there is a goal hierarchy 24, which is an outline of all of the goals to be achieved in the task, where each major goal may be subdivided into a set of sub-goals, which may also be subdivided into sub-goals, etc. Sub-goals may be thought of as necessary conditions for the achievement of the parent goal, but not always sufficient conditions. Second, there is preferably an expected plan 26, which is a recipe for the successful attainment of the goals in the goal hierarchy 24. The expected plan 26 is initially presented as a linear plan of action, which itself begins the execution of a set of repetitive sub-plans and the monitoring for trigger conditions of a set of triggered plans. Thus, the expected plan 26 may branch into a system of plans and sub-plans, wherein the repetitive plans are those that the participant is expected to repeat at certain intervals, such as repeated communications with other officers or repeated checking of maps and charts. Triggered plans, as the name suggests, are preferably triggered by certain events or conditions, such as transferring control to a Tactical Command Center once certain conditions are met. In a presently-preferred embodiment of the present invention, the third component of the task model is a staff battle plan 28. A staff battle plan 28 is a set of prescribed activities that the participants and other characters are expected to follow in the event of an unforeseen occurrence. While the occurrence is unforeseen, the possibilities and the proper activities for handling it are well defined.

Figure 2:
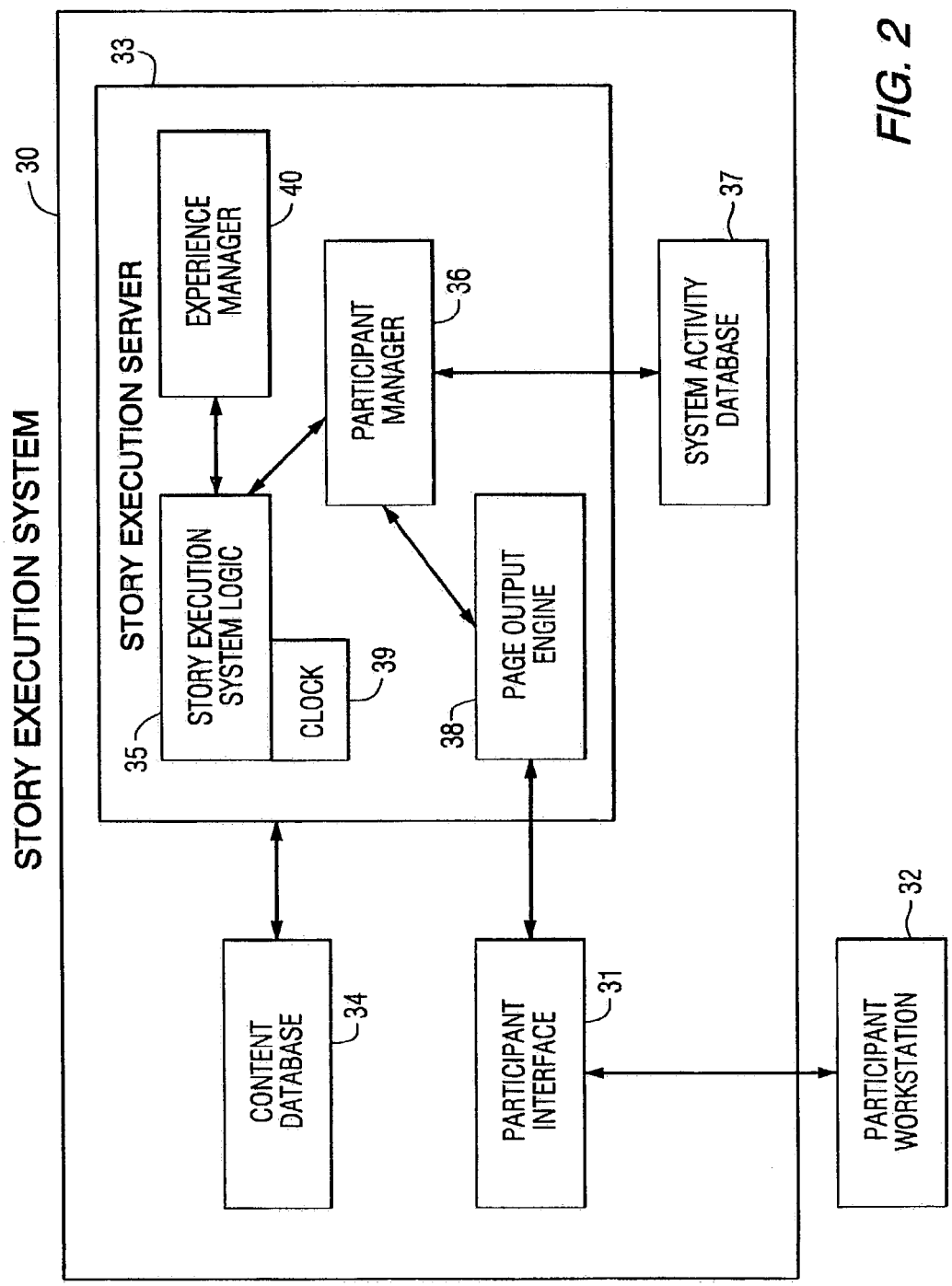
FIG. 2 is a diagram of certain components of the content delivery process of a presently-preferred embodiment.

Referring to FIGS. 1 and 2, a story execution system 30, is preferably a computer that selects the story elements and delivers them to the participants through a participant interface 31 connected to each participant's workstation 32. The story execution system 30 sends the story elements to the participant workstations 32 and records participant reaction to these elements, which is entered into the participant workstations 32 by the participants. Thus, the story execution system 30 provides for both input and output for the run-time operation of the simulated environment. Additionally, participants preferably have video connectivity so that they can see their fellow participants on their computer screens.

In a presently-preferred embodiment of the present invention, the story execution system 30 includes a story execution server 33, which is preferably a web server, such as an APACHE Web Server, having additional server-side logic that manages the simulation. A content database 34 is linked to the story execution server 33 and delivers to it the media content for the simulation according to the programmed story execution server logic 35 derived from the task model 22 and in response to input from the participants and/or input from the instructor. This input may be audio-based, video-based, text-based, and graphically-based. The story execution server 33 then delivers the media content to the participants' workstations 32 through the participant interface 31, which preferably uses readily-available web technology to communicate with the story execution server 33. The story execution server 33 may also create and deliver the simulation's web pages in accordance with known web page construction techniques and insert keyed Hypertext Reference (HREF) Anchors to the interactive controls so that the server can track and relate the participants' actions. The participant workstations 32 may then be web browsers that use plug-in components, such as a SHOCKWAVE PLAYER, and basic scripting for display and interaction with the media. It also allows the participants to use a variety of existing media presentation components without source modification. FIGS. 1 and 2 show three participant workstations 32, although more or less than three may be used as necessary, depending on the number of participants.

The story execution server 33 preferably includes a participant manager 36, which may be a web page publishing engine that creates and maintains all interactions with the participant workstations 32. The participant manager 36 keeps the tables listing the current state of the participant interface and the triggers for the experience manager 40 (discussed hereinbelow). It also sends output to a system activity database 37, which maintains a log of all activity of the participants and the system itself.

The story execution server 33 may also include a page output engine 38, which is a server that creates and delivers the formatted output (web pages and media content) to the participant workstations 32. The page output engine 38 preferably utilizes tag substitution, which is managed by the participant manager 36. Tag substitution works to create a normal reference between the display control element on the participant workstations 32 and the related function on the story execution server 33 that the tag will trigger. The participant manager 36 can then pre-process and forward the related command to the story execution server 33 components to influence the simulation's future course. Dynamic tags may thereby be generated that are specific to the singular nature of the currently running simulation, not relying upon hard coded tags generated during authoring that would not support a dynamic experience manager 40. This allows different simulation events to use the same content files in various ways and with various individuals with alternative feedback results.

The participant manager 36 is preferably broad enough to maintain connections to multiple remote entities that utilize or communicate with the story execution server 33. This allows for a pass-through design where tagged elements can be normalized with remote simulations who may not be in the same simulation environment. The participant manager 36 provides a common interface through which the simulations may inter-communicate. The participant manager's 36 tag substitution allows alternative tag types for various participant types. Such a structure also allows for automated systems to interact as virtual participants or for media generators to create dynamic new media with the system as necessary. This remote capability frees up the story execution server 33 to support the output and create a platform-independent runtime environment for automated media generation.

Creation and delivery of the output page is preferably accomplished by dynamically allocating media elements into a set of templates that are specific to the participant. In this way, a unique control set can be created for each participant that is specific to their function. This also allows for support of multiple browsers or client platforms that react in different ways to HTML layout rules.

Time is often of the essence to achieve the goals within the training environment successfully, but occasionally time may be suspended while the participant receives advice or criticism from the instructor or, in a gaming application, from the game manager or game monitor. Thus, the story execution server 33 may further include a master clock 39, which can receive external commands that will suspend or halt the story execution server 33, or suspend a participant's time. Time preferably may be halted for any set of participants or for any event. When time is halted for an individual or exclusive group during a simulation, it may be thought of as a suspension, after which the participant or participants will rejoin at the current system time, missing events that have occurred during the suspension period. If desired, reactions may be automatically inserted by the story execution server 33 to default selections specified during the authoring process. When the suspended participants re-enter the scenario, their participant interfaces 31 are refreshed to bring them up to date with the current simulation. This mechanism is also used to allow for participants who drop their connection to the story execution server 33 to be processed by the story execution server 33, which provides default responses to the scenario enabling the simulation to play out without adversely affecting the continuity of the experience. Alternatively, the instructor may wish to use the dropped connection as part of the exercise.

Figure 3:
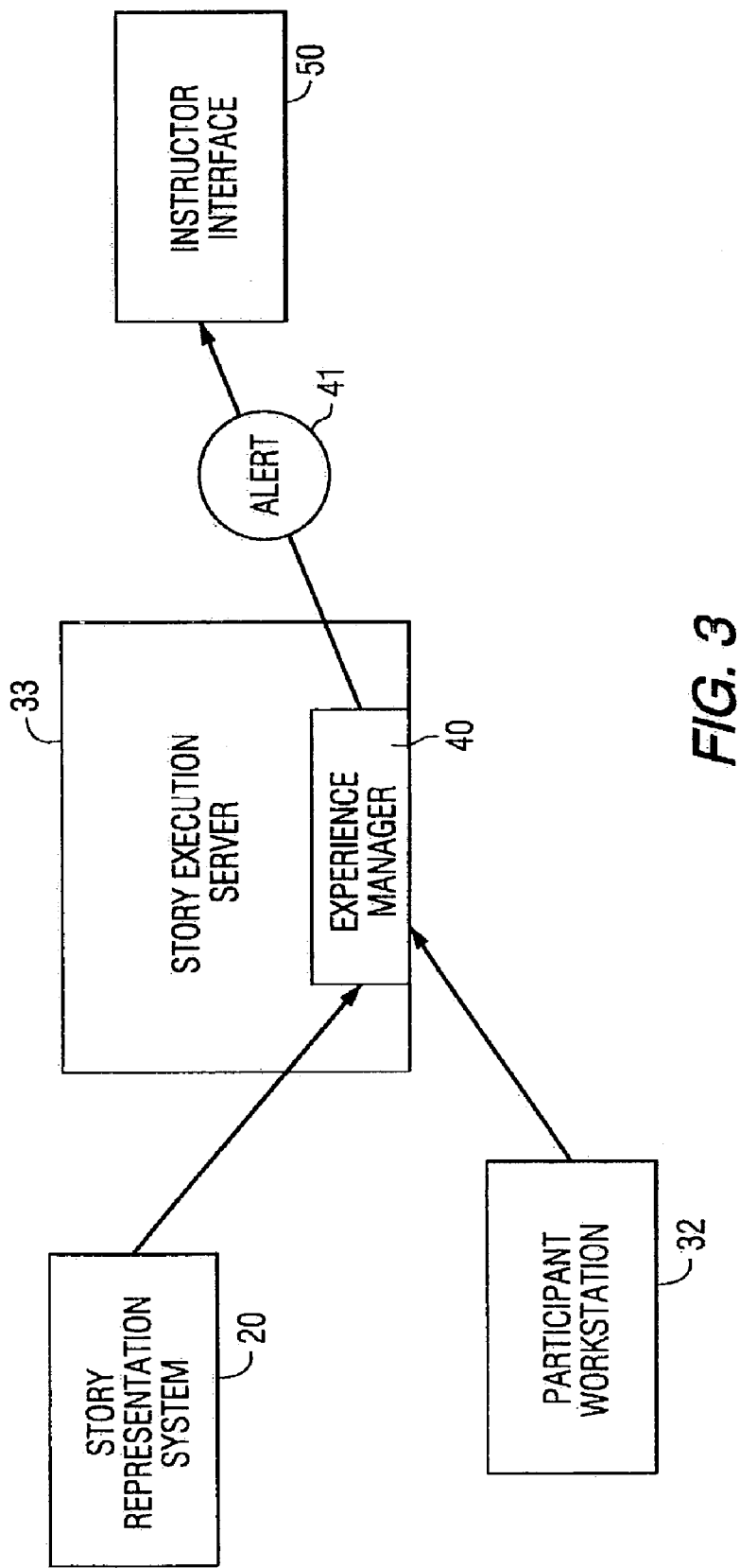
FIG. 3 is a diagram of the monitoring process of a presently-preferred embodiment.

Referring to FIGS. 1, 2 and 3, an experience manager 40 is preferably an artificial intelligence rule engine residing on the story execution server 33 that monitors the progress of participants in the simulation and compares the progress to the pedagogical and dramatic goals of the simulation as expressed in the story representation system 20. When differences cause specific rules to be triggered, the experience manager 40 generates an alert 41 and recommends modifications to the storyline that help keep the simulation on track. These processes are described in greater detail hereinbelow. Participants' reactions to the simulation events are expressed through the interactive components, such as audio/video conference, that are part of the participant interface 31.

Figure 4:
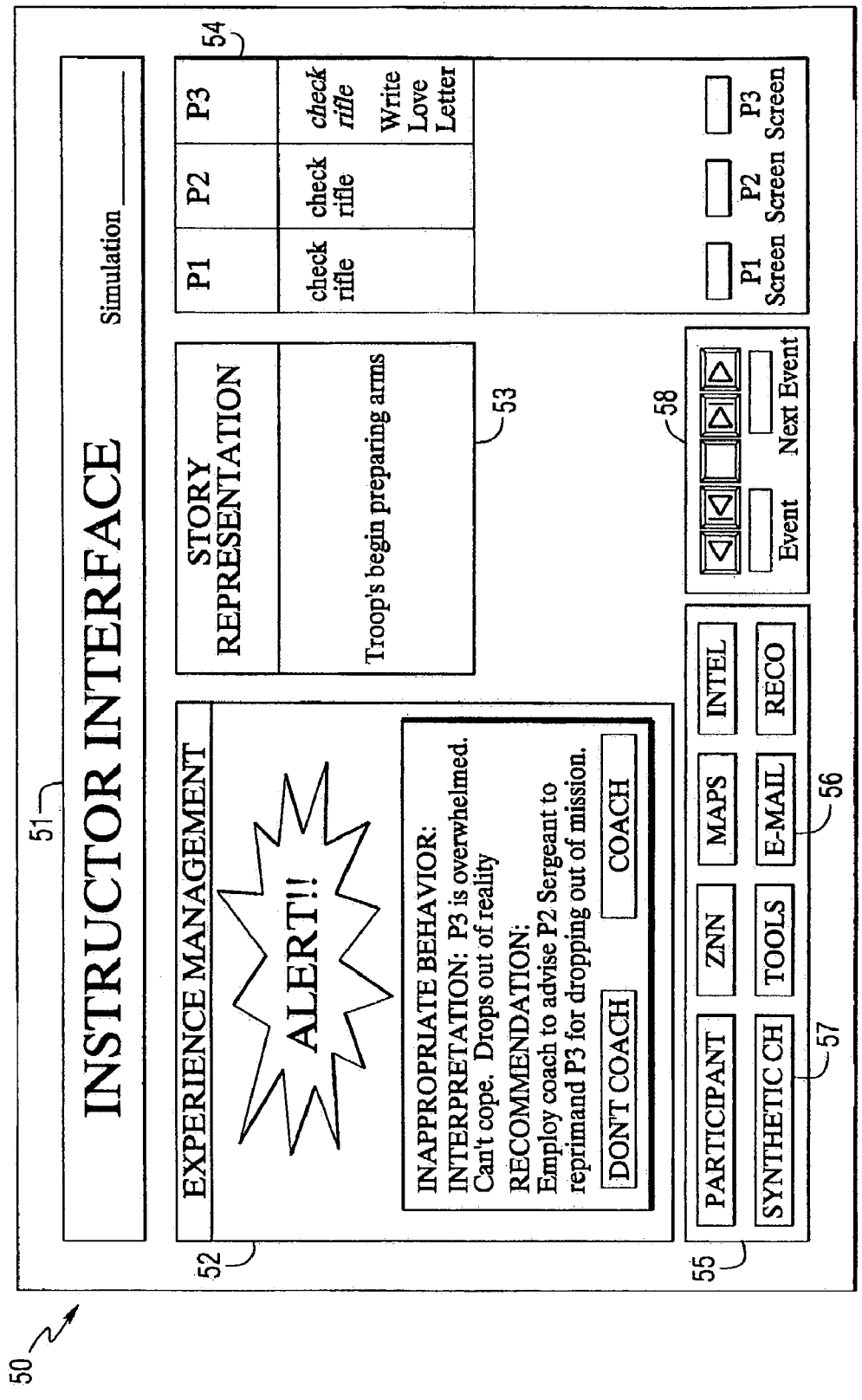
FIG. 4 illustrates an example of the monitoring process of a presently-preferred embodiment.

Referring to FIGS. 1 and 4, an instructor interface 50 is preferably a web client that communicates as a special class of participant through the story execution system 30 with the content database 34 and the experience manager 40 in order to present to the instructor an event-by-event description of the simulation as it actually unfolds and to display the participants' expected and actual behaviors. In a general gaming application, the game manager or game monitor may use the instructor interface 50 in much the same way as an instructor would. A plug-in, such as JAVA APPLETS OR SHOCKWAVE PLAYER, preferably manages the communications from the instructor interface 50 through the story execution system 30 in order to update media event records, call routines that would affect properties that influence the experience manager 40, may select alternative media for a participant, or manage the story state. Thus, the instructor may adjust the direction of the simulation to maximize the dramatic and educational effectiveness of the simulation and to interject new elements and information when necessary. The instructor interface 50 preferably includes a heading 51, which indicates the name or number of the simulation. Also present on the instructor interface 50 is an experience manager display 52, a story representation display 53 and a participant display 54. Alerts 41 and corresponding recommendations generated by the experience manager 40 may be displayed in the experience manager display 52. The story representation display 53 depicts the expected storyline and the way it is affected by the participants' behavior. The participant display 54, along with various access tools 55, gives the instructor access to all of the participant elements, such as maps, charts, newscasts, tools and so forth. The instructor may preview any or all of these elements and may also modify them as necessary. The instructor interface 50 also includes various other tools, such as an email tool 56 for communicating with participants, a synthetic character development tool 57 for generating and inserting synthetic characters 60 (discussed below), and a clock 58 for keeping track of time in each story state.

In a presently-preferred embodiment of the present invention, the instructor interface 50 handles the master state of the story. Present on the instructor interface 50 may be a master list of states for all media to be presented in the expected story, along with a set of entries that represent each media element that should be selected in order to transition to the next state. The state of the instructor interface 50 is defined as the totality of media that is currently displayed and that can be triggered in the immediate future by selecting any interactive control on the instructor interface 50. The transition from one state to the next is the updating of the media on the participant interface 31 by initiating a selection that alters what is seen or what may be selected in the immediate future. As the participants access each media element, an identification tag is preferably sent to the instructor interface 50 to be presented as text and icons in the story representation display 53 and the participant display 54. To progress to the next state in the story, each required item in the current state should preferably be accessed while in that current state. Participants may access other media not related to the current state and these will be transmitted to the instructor interface 50 as well, but without influencing the state transition. Once all of the required media elements are selected, the state then transitions to the next state, and this transition is reflected accordingly on the clock 58.

Returning to FIG. 1, synthetic characters 60, which are video or computer-generated speaking images, may be introduced into the simulation for various reasons. For example, a synthetic character may be required to play the role of a character in the story or the role of another participant. Alternatively, it may be required to provide coaching to participants automatically or through directives from the instructor via the instructor interface 50. They can play adversaries or friends or other personalities that say or do things that make it necessary for the story to head in the required direction. They can also substitute as participants when sufficient numbers of live simulation participants are unavailable.

An automated coaching system 70 is a computer program connected to the story execution system 30 that provides pre-programmed advice and instruction to the participants, either automatically or when prompted by the instructor. It preferably uses artificial intelligence technology to monitor participant performance and recommend appropriate actions to the participants.

Authoring tools 80, which are applications connected to the story representation system 20, enable non-programmers to create new simulations based on new or existing storylines. The authoring tools 80 are a collection of applications that allow for the generation and integration of the media that represents the story into the content database 34. They are image, video, audio, graphic and text editors, interactive tools (such as for simulated radio communications or radar displays), interface template layout editors, or tools that integrate these media elements into the story. The authoring tools 80 enable non-programmers to create new scenarios that take into consideration pedagogical goals and the principles of good drama and storytelling.

Immersive audio 90 is connected to the story representation system 20 and may be used to give the experience an especially rich and authentic feel. Immersive audio 90 provides a level of realism that helps propel the participants' emotional states and raise the credibility of the simulation.

The system is preferably designed to support a story-based simulation. Story-based simulations depend upon information transferred to the active participants and upon the participants' interaction with that content. The information is presented to the participants in terms of content media. The media may take any form of representation that the participant workstations 32 are able to present to the participants. The media may play out in a multitude of representational contexts. For example, audio may be a recorded speech, the sound of a communications center or a simulated interactive radio call. These three examples could be represented with different participant interfaces, yet they are all audio files or streams.

Figure 5:
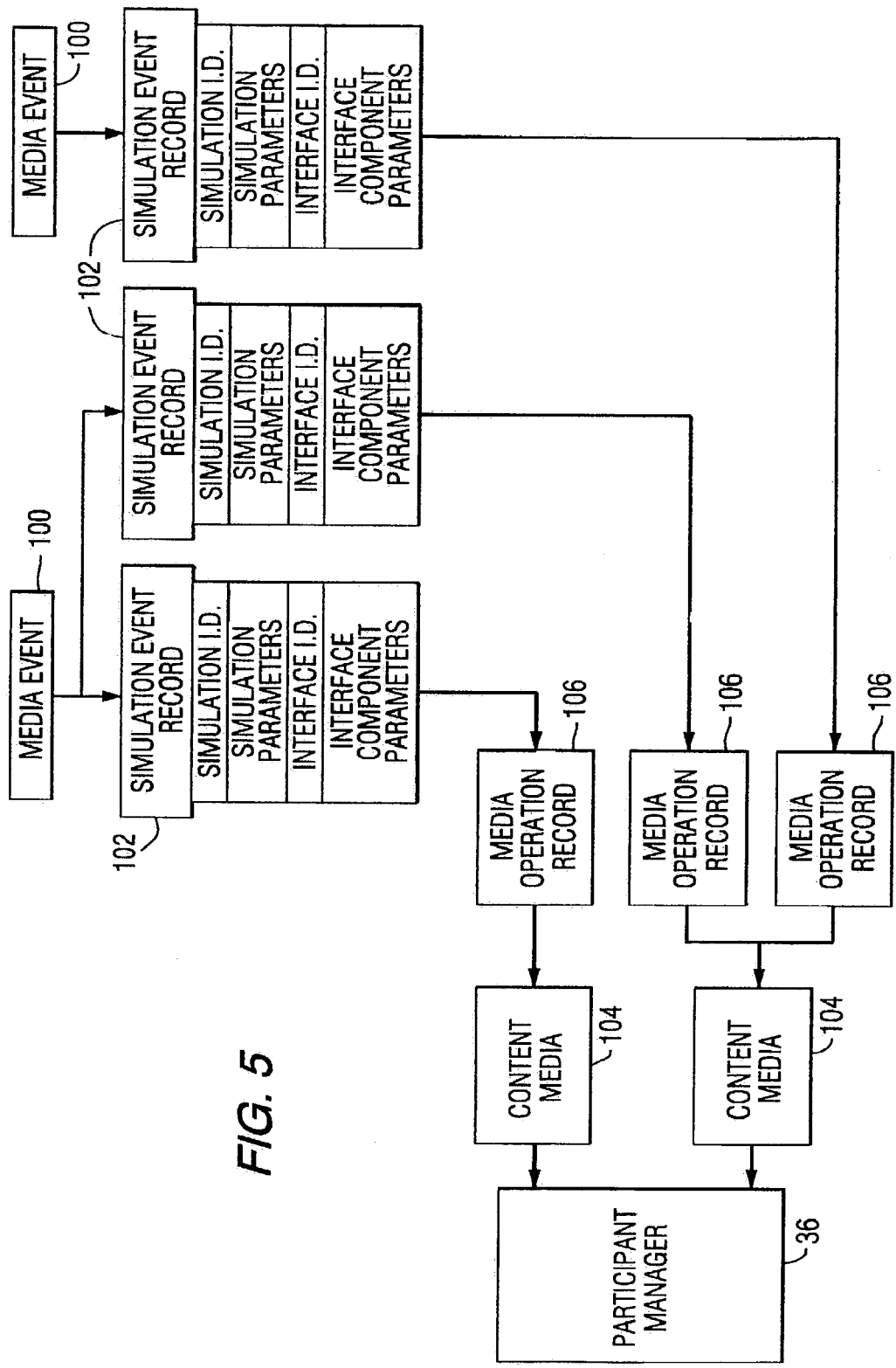
FIG. 5 is a diagram of the media record structure of a presently-preferred embodiment.

Referring to FIGS. 2 and 5, the story execution system 30 obtains the simulation media components from the content database 34. All simulation-related media and references have record definitions in the content database 34 that define them as media events 100. Media events 100 are the master records for content that is presented by the story execution system 30. A media event 100 is a description of information related to the nature of the corresponding media component and the impact it has on the simulation, required content media, positioning and playback control information. Not only can media components be played out from the content database 34, but they can be created and inserted into the content database 34 during authoring (i.e., internally) or from an external system during the runtime. Information related to the story representation system 20 and required by the experience manager 40 is also expressed as a media event 100. The media events 100 not only allow for markers for authoring, monitoring and evaluation, but also provide required data to assist the experience manager 40 in processing directives.

Media events 100 can be different to different participants and preferably support polymorphism, that is they may be presented in any one of a number of modes. This is due to the fact that participants' interfaces 31 may be different in terms of display components, alert importance and desired representational form.

The records of media events 100 preferably contain one or more simulation event records 102. Each simulation event record 102 contains information related to action and performance of the simulation event in a particular participant interface. The simulation event records 102 contain the parameters for the individual component they will represent. They also contain the identification symbols for the components and parameters that manage their layout. This data is transferred to and referenced by the participant manager 36, which acts as the repository of current state information for the experience manager 40.

The simulation event records 102 preferably hold the information that is related to the role of the media in the participants' interfaces 31. If required, a specific media event 100 may contain a separate simulation event record 102 for each participant. Different participants may utilize different layouts for the media in their interface.

A simulation event record 102 is preferably linked to content media 104 through a media operation record 106. The media operation record 116 is specific to the simulation event record's 102 usage of the media. The content media 104 is a generic media record that is indifferent to playback component requirements. This many-to-one relationship between media operation records 106 and content media 104 facilitates effective polymorphic usage of the media and its application. All participant interaction and simulation milestones are logged into the system activity database 37, which allows for manual review and re-creation of a simulation.

Several of the components disclosed herein preferably utilize artificial intelligence technology. These artificial intelligence engines may be rule-based, wherein a computer is programmed with a set of rules for generating output in response to various inputs. For example, a program may be designed to associate a specific simulation output explicitly with a particular input by a participant. However, in other preferred embodiments of the present invention the artificial intelligence engines may be non-rules based and may employ machine learning-type algorithms, such as Bayesian learning and Parallel Distributed Processing—(PDP or neural net) type algorithms. One of skill in the art of machine learning would be familiar with additional algorithms that would be functional within the context of the present invention.

Operationally, the approach of the present invention may be described with the term "story-channels," to replace the traditional notion of a "storyline." The term is derived from the metaphor of the system of gullies and channels that are formed as rainwater drains into lakes and oceans. Globally, the channels may be either linear (a single valley, for example) or may have a branching tree structure, caused when a main valley is fed by multiple sources. Locally, the channels can be very wide, such that someone paddling a canoe could chose from a huge range of positions as they navigated along their way. In the same manner, the invention's approach to interactive storytelling is akin to making the participant direct a canoe upstream in a system of story-channels. The storyline could potentially have significant branching structure, where certain decisions could have drastic effects on the way the story unfolds. However, most decisions will simply serve to bounce the actor from side to side within the boundaries of the channel walls, never allowing the actor to leave the channel system entirely to explore in some unforeseen direction. This metaphor is useful in describing four key parts of the development and use of the invention. First, the "authoring process" for interactive narrative is to construct the geographical terrain, to describe the (potentially branching) series of mental events that the actors should experience as they play their role in the story. Second, during the actual running of the simulation, a "tracking process" monitors the position of the canoe, observing the actions of the characters controlled by the actors in order to gather evidence for whether or not the actors' mental states adhere to the designers' expectations. Third, a "containing process" will serve as the walls of the channels, employing a set of explicit narrative strategies to keep the actors on track and moving forward. Fourth, a "tutoring process" will serve as the actors' experienced canoeing partner, watching the way that they navigate upstream and looking for opportunities to throw an educationally valuable twist in their paths.

The simulation delivered to the participants preferably depicts a series of events, characters and places arranged in a specified order and presented via web pages and media events, such as video, audio, text and graphic elements. The media events may include items such as news stories, media clips, fly-over video from reconnaissance aircraft, synthetic representations of characters, maps, electronic mail, database materials, character biographies and dossiers. Initially, a specific "story-channel" (or a branching set of storylines) is constructed for the interactive environment, and the events that the participants are expected to experience are explicitly represented in the story representation system 20. The story execution system 30 initially selects the appropriate simulation elements from the content database 34 according to the story representation system 20 and the task model 22.

The experience manager 40 tracks the participants' actions and reports them to the story execution system 30 for comparison with the story representation system 20 and the task model 22. Each participant action is identified, for example as being "as expected" or as "different from expectations," although other types of identifiers may be used. The experience manager 40 analyzes the participants' input and flags performance that does not correspond to expectations. In response to such unexpected performance, the experience manager 40 then generates the alert 41 and sends it to the instructor interface 50. The alert 41 not only points out when participant behavior deviates from expectations, but also suggests responses that the system or the instructor can make in reaction to the unexpected participant performance. These responses are designed to set the simulation story back on course or to plot out a new direction for the story.

Alerts 41 generated by the experience manager 40 pass to the instructor interface 50 for acceptance or rejection by the instructor and then back to the story execution system 30 for forwarding to the experience manager 40. Changes to events and media initiated by the instructor via the instructor interface 50 also pass to the story execution system 30 for forwarding to the experience manager 40. The chosen option is converted by the experience manager 40 into a media event 100 and inserted into the content database 34 for immediate or later playback to the participants. Thus, when the experience manager 40 determines that it will generate a new media event 100, it will create a record that allows the story execution system 30 to present the media event 100 to the participant. As such, the experience manager 40 is not required to know about the intricacies of the particular participant interface 31 that the participant maintains, only the nature of the media event 100 that may be produced. The participant manager 36 matches the media event 100 to the layout specifications for the participant interface 31 when triggered. Tags are substituted with the aid of the experience manager 40 and the media event 100 will be actualized by the participant workstation 32.

The operation of the experience manager as well as its interaction with the story representation system in a presently-preferred embodiment of the present invention will be described using a specific military example.

The present invention preferably begins a simulation with a moderately branching story structure. This branching storyline encodes the expected storyline, which is a description of the set of experiences that participants are to have, along with a partial determination of the actions that they are expected to take. Non-determined actions may be encoded as branch points. However, the present invention is preferably designed such that participants can take any action available to them from their user interface at any time, not just the set of actions that are expected of them as encoded in the expected storyline. When participants take an action that is not described in the expected storyline, the experience manager 40 makes a determination of whether the deviation from expectations will move the storyline off track, and if so, applies an experience management strategy to generate slight accommodations to the story and move the state of the simulated experience back onto the expected storyline.

It is partially within this aspect that the present invention particularly differs from the prior art. Whereas the prior art presented participants with an inflexible, hard-coded branched storyline, the present invention preferably has an expected storyline that is moderately branched. The present invention further allows for the dynamic altering of that storyline based on the actions that are taken by participants and the goals that are to be achieved during the training process. At the same time, the present invention promotes achieving of the goals of the training experience while maintaining a textured and compelling environment for the participants.

One of the main tasks of the experience manager is to maintain the instructional goals of the training experience by keeping the participants on the track of the expected storyline and moving towards achieving the goals of the simulation. Participants in the simulation are preferably provided with a sense of free will by providing them with numerous options for responses within the simulation. One potential difficulty with this flexibility is that the participants may manipulate the simulation in a direction that moves away from the overall goals of the simulation, e.g. specific topics to be learned within a training experience or specific goals to be achieved within a gaming experience. Thus, a conflict may exist between the flexible environment for participants and achieving the goals of the simulation. The experience manager preferably resolves this conflict by suggesting accommodations to the storyline so as to promote the achievement of the specified goals while maintaining the sense of realism to the simulation.

An example of the use of the experience manager may be described in the context of a typical scenario. In the scenario, a platoon of troops is inspecting a weapons storage site in the Bosnian town of Celic, and after finding that weapons are missing, a hostile crowd forms around the site, and weapons are spotted in the crowd. The platoon calls up to their superior commanders, and soon the brigade-level Tactical Operations Center (staffed by participant trainees) is in charge of putting together a rescue operation. Having planned an operation, orders are sent to participating battalions and their companies and preparations begin to launch the operation. However, it becomes evident that one of the participating companies, a company of military police, is not ready. The tactical operations center members may decide if they can execute the operation without the MP company and issue the order to move out or hold up.

In the expected storyline, it is envisioned that the brigade Tactical Operations Center will decide that the mission can be executed without the MP Company and that they should move out the troops immediately to ensure speed and surprise. If the Tactical Operations Center orders the troops to hold up until the MP company is ready, then this represents a deviation from the expected storyline that will have a significant effect on how the storyline unfolds.

If the Tactical Operations Center decides to hold up the troops, the experience manager preferably suggests an accommodation to the storyline to get the story back on track. At this point, a number of different accommodations could be suggested. For example, if the MP company was not important in the future of the story, then the system could simply change the story such that the MP company becomes ready after a brief delay, and the troops move on their way. If it is necessary that the MP company remain separate from the mission, then the story could be changed such that the commanding officer presiding over the Tactical Operations Center (e.g., the brigade commander) calls in on the radio and demands that the operation begin without waiting for the MP company. Alternatively, the MP company could radio in moments later to report that the situation is worse than they first thought and that they will be completely out of commission until further notice. In another scenario, a participant in the simulation may decide to transport his troops down a road that will lead the simulation in an inappropriate direction. The experience manager may suggest several accommodations to the storyline to avoid the user from moving in that direction. For example, the experience manager may suggest that the road has been reported to be mined, that a heavy fog has been reported in that direction, or the brigade commander may call in on the radio and demand immediate movement to the point of conflict. Each of these responses has varying degrees of heavy-handedness from a story-telling perspective. Some retain the perception on the part of the participants that they have free-will in the environment, while others seem to simply tell them that they made the wrong decision and must choose a different course of action. In the design of experience management strategies in the present invention, the intention is preferably to create a repertoire of strategies that allow the participants to retain the sense of free will. The experience manager itself is preferably designed to take into account the degree of heavy handedness of the intervention and choose first those interventions that are not heavy handed, the most notable of which is not to intervene at all.

An important advancement of the present invention with respect to experience management concerns how it deals with the issue of generality. This may be illustrated by considering the simplest approach to implementing an experience management system. Consider that a storyline could be represented as a sequence of actions that a user is expected to take at certain moments in the story and that between these actions there are media events presented to the participant to describe the simulated world. This representation could be visualized as a one-dimensional vector:

| Action 1 | Action 2 | Action 3 | Action 4 | ... | Action n |
|---|---|---|---|---|---|

Likewise, the full set of possible actions that could be taken by participants using the system could also be represented as a one-dimensional vector. In a preferred embodiment of the present invention, these actions may be represented as predicates, that is logical representations of specific occurrences within the simulation. In a tactical operations center, this list may include actions such as sending the MP company to the town of Celic, requesting that the air assault team expedite their maneuvers, ordering a battalion to cordon off the nearby town of Pukis, etc. An example of such a vector might be as follows:

| MP to Celic | AA expedite | Cordon Pukis | ... | Action n |
|---|---|---|---|---|

If the option of doing nothing at all were added to this vector, it would then represent a description of all of the potential actions that a user could possibly take at any moment within the simulation experience of the present invention.

The combination of these two vectors creates a matrix that couples every possible action that a participant could take in the simulation at each point in time with every expected action that a participant is to take to move the story forward. The expected storyline that a participant experiences could thus be represented as a series of actions. Cells in this matrix may then be filled in when the expected action is equal to the possible action, as follows:

|  | Action 1 | Action 2 | Action 3 | Action 4 | Action 5 | ... | Action n |
|---|---|---|---|---|---|---|---|
| Nothing |  |  |  | X |  |  |  |
| MP to ... | X |  |  |  | X |  |  |
| AA exp ... |  | X |  |  |  |  |  |
| Cordon ... |  |  | X |  |  |  |  |
| ... |  |  |  |  |  |  |  |
| Action n |  |  |  |  |  |  | X |

Given this representation, the job of the experience manager may be seen as determining how the storyline can be changed if an unexpected action is taken at each of the storyline points, i.e., a participant selects an action represented by an empty cell at an inappropriate time. Given N possible actions and M moments in the story where an action can be taken, then the number of potential storyline accommodations that are preferably to be provided is simply N multiplied by M.

The simplest computational approach would be to hand-author a simple if-then rule to be executed when an unexpected action is taken at a given story moment. However, the feasibility of this approach quickly becomes intractable with storylines of any significant length and a rich set of possible actions. If there are fifty actions that the participants can take from the tactical operations center interface and fifty moments in the story where these actions can be made, then there are 2500 places where some storyline accommodation may be required. From a development perspective, this approach is even less appealing, as it requires that the work be performed every time that there is a change in the set of potential actions, and every time that there is a change in the storyline.

The alternative approach that is taken by the present invention is preferably to determine the appropriate response of the system to the participants to keep the storyline on track. This level of automation allows for accommodations to the storyline and possible user actions without requiring the re-specification of accommodating storyline changes each time an in appropriate action is taken by a participant.

A key to determining the accommodations to the storyline automatically is to provide enough information to the experience manager about the storyline to allow it to generate the appropriate selection among a broad range of possible accommodations. In the present invention, this information is preferably encoded into the representation of the storylines themselves. By replacing the simple ordered set of expected user actions (as shown above) with a rich representation of the experience that users have in the simulation, appropriate accommodation strategies can be identified without the aid of human intervention.

As described above, the experience manager's task can be described as selecting the most appropriate accommodations to the storyline that should be enacted, based on the actions that the participants have taken and their location in the storyline. To provide the necessary information to make this decision, the present invention preferably represents storylines as more than simply sequences of expected user actions. Although participant actions are included within story representation of the present invention, a great deal of additional information (e.g., representations of expected storylines, representations of media events, and representations of typical human instructor actions) is encoded in order to allow for the application of a generalized set of experience management strategies.

As mentioned above, storylines within the present invention preferably begin with moderate branching, so that a small number of key decision points determine major branches of outcomes that participants can experience and which are supported by rich media assets pre-authored for a particular scenario. As in the example above, there may be two outcomes authored for a scenario involving the disarmament of a hostile paramilitary force. At some critical point in the scenario, the participant may be required to make a decision that will lead to the ultimate success or failure of this mission. Such a storyline might be represented as a simple branched tree, as follows:

In this case, a simpler conception of the storyline is as a set of three story segments, of which a user will experience only two (either A and B, or A and C). Segment A ends with an indeterminate expectation of user actions of two different possibilities, with links to B and C segments.

In the present invention, non-branching storyline segments (e.g., A, B and C) may be formally represented as an ordered sequence of expectations about the thinking processes of the user as they are exposed to media elements that tell the portion of the story associated with the storyline branch. These formalizations may be based on preliminary formalizations of commonsense psychology described using first order predicate calculus. In a presently-preferred embodiment of the present invention, predicate calculus statements in this ordered list are preferably grouped such that there is exactly one user-based mental event expectation per group, and every argument in the predicate calculus statement of the mental event has been introduced preceding the statement. Alternatively, the story representation system may use a machine learning algorithm to represent the expected storyline as described above.

In the case of the MP company, the expectation is that the participant will come to believe that their current plan is going to be unsuccessful for accomplishing the mission because of the delayed agency of a constituent agent in the plan. The expectation is that the participant will decide to execute a new plan that does not involve the delaying agent. This segment of story representation corresponds to a moment in the scenario described above, where the Tactical Operations Center must decide whether or not to execute the rescue without the MP company, which is delayed. Only one action of the participant is expected, that they execute the modified (no-MP company) plan. As this is the only action that is expected, this point does not constitute a branching storyline decision. Instead, it is a required action to keep the storyline on track.

Such formalisms may include predicate calculus for the storyline and participants' actions may be represented. To accomplish its tasks, three representations may be maintained by the experience manager: the previous storyline, the future storyline, and the participants' input.

As the participants take action (or inaction) and the storyline moves forward, the concatenation of every previous state of the storyline simulation along with the current instance of story representation constitutes the previous storyline. This ordered list of story representations constitutes the expectations that the system has about the way that the simulation has been experienced by the participant(s), and includes the next expected action that they will take. The previous storyline preferably includes all of the representations of every story segment that the user has already experienced.

In a presently-preferred embodiment of the present invention, all potential events that occur within the simulation may be expressed formally as predicates, i.e. specific logical propositions that correspond to occurrences in the simulation environment. The set of all predicates may be considered as comprising a multi-dimensional vector, wherein the number of dimensions is equal to the number of predicates that are required to fully describe all of the occurrences in the particular simulation. Each element of the vector would preferably have a numerical value that may range from 0 to 1. The value of each element may be determined by the recency with which the participants have experienced to this predicate. Such vectors may be used to represent both the past storyline and the future storyline.

Every aspect of the expected storyline representation that has not yet been experienced constitutes the future storyline. In cases where the current story segment does not end with a branch point, there is only one future storyline. In cases where the current segment ends with a branch point, then there is one future storyline for every possible route through the remaining part of the branching storyline structure.

Each point in the future expected storyline may be represented by the multidimensional vector that contains an element for each predicate that the participants may experience in the simulation. Each element would have a value that is determined by the recency with which the participants will experience this predicate in the future expected storylines.

Finally, the experience manager maintains representations of participants' input. Every piece of evidence entered from the user interfaces constitutes the participant evidence list which is ordered in accordance with the order that the evidence was submitted to the experience manager. Therefore, this list preferably corresponds to media events and user inputs from the actual simulation experience.

The experience manager preferably uses these three sets of representations to select storyline accommodations when unexpected user actions are encountered where these accommodations are appropriate given the current state of the story. The current state of the story, as well as the evidenced participant actions, are preferably represented to the experience manager as these three groups of ordered story representations, where the future storyline may have multiple versions if branches in the storyline remain to be determined by participant action.

The information that is provided in these three groups of representations is preferably rich enough to allow the experience manager to select contingencies (in the form of storyline accommodations) to be executed in the event that the participant selects an unexpected action. For every sort of storyline accommodation that is imaginable, it is possible to specify the criteria by which the accommodation should be selected as a set of generalized trigger conditions that match over these three groups of representations. Within the context of the present invention, these trigger conditions may be authored as story representation statements that may contain variables in the predicate-argument structure, in the same manner that operators in STRIPS-style automated planning systems can be described with variables in their preconditions (Fikes & Nilsson, 1971; *Artificial Intelligence,* 2: 189–208).

For example, consider how the trigger conditions described for the following strategy would be specified. Suppose that the user in the above scenario (who must decide whether to hold up the troops or move them out) decides to hold up the execution of the original plan while waiting for the MP company to become prepared. This action would be signaled by the participant interface, and would arrive at the experience manager. Among the many possible ways of accommodating this user choice would be to have the Battle Captain in the Tactical Operation Center (in this case, the brigade commander) send a message to the user team and tell the team that he or she has been monitoring the decisions of the group, found their choice to be a bad one, and so orders the group to execute the modified plan without the MP company immediately. If appropriate experience manager accommodations were hard coded for every action, then an urgent email from the brigade commander with this message could be pre-authored and sent to the participant in the event that they suspend the execution of the plan.

However, it is preferable to generalize the use of the brigade commander accommodation in the broadest way possible and to allow for the automatic selection of this type of accommodation strategy during the runtime performance of the present invention. For example, it may be appropriate for the brigade commander to send such a message any time that the participant is delaying the execution of a plan when it is required that they do so for the storyline to progress. The present invention preferably provides for the generalization of this media event to multiple instances where such a response is appropriate.

For example, non-rule-based algorithms that employ machine learning could be used by the experience manager system to identify these trigger conditions automatically and to suggest accommodations to a storyline that has gone off track. The non-rule-based algorithm may be exposed to multiple simulation run throughs (i.e., simulation trials) in which a human instructor generated accommodations to the storyline so as to keep participants moving along a storyline that results in the achievement of pre-specified goals. The algorithm would then preferably internally changes values or weights of variables within the algorithm to represent the human trainer's behavior. If the algorithm were exposed to numerous simulation trials that used multiple examples of accommodations that were proposed by human instructors, the algorithm would preferably learn those accommodations and represent them within the algorithm. The algorithm that had been thus trained may then be used at a later time to generate appropriate accommodations to a storyline without the need for human instructor intervention. The algorithm would preferably suggest storyline accommodations when it recognized that participants had chosen an action that would result in a human instructor intervention, that is, when participants chose an action that resulted in the storyline going off track. Preferably, the experience manager would present multiple options to the human instructor with confidence measure for each to indicate the likelihood of success of that accommodation.

The experience manager of the present invention preferably also accomplishes other tasks. When an errant strategy is executed by a participant, the expectation that the experience manager had that the user would execute the expected action is known to be false. Other expectations that led up to the expected action may also be believed false. These expectations are preferably not be used to trigger strategies in the future, now that evidence has been received that they are invalid. To invalidate past storyline expectations, they first need to be specified in the trigger conditions for the strategy and be marked so that they are invalidated upon strategy execution.

The changes to the expectations about the experience that the participant will have now that the storyline has been adapted are also preferably represented. To accomplish this, new expectations are preferably added to the expected storyline. For example, if the strategy of having the brigade commander send an urgent message to the participant is employed, then the expectation that the participant believes that brigade commander wants the participant to execute the plan immediately must be added. This story representation will then possibly serve as the trigger condition for other sorts of experience manager storyline accommodation strategies (e.g., what to do when you disobey brigade commander's order). Story representation insertions may be specified in the accommodation strategy directly and can constitute entirely new storyline moments inserted before or after a specific location in the storyline or just pieces of story representation that should be appended to an existing storyline moment.

The third storyline effect that may be encountered within the context of the present invention is to cause the advancement of the storyline, even though the required action has not been executed by the participant. Note that in some cases, it would not be desirable to have the execution of an experience manager strategy forcefully cause the advancement of the story, but this is likely to be the exception rather than the rule.

The final information needed to represent an accommodation strategy is to assign it a relative preference to be used in ranking multiple strategies that may be appropriate. This grade will allow the system to select between two or more strategies that all match the necessary trigger conditions.

By way of further example, multiple participants may be placed in the roles of United States Army personnel in a Tactical Operations Center (TOC) during a Stability and Security Operations, and may be presented with a number of challenging decisions that are to be addressed. Alternatively, to imagine a simple example in general game-play, the United States Army personnel described below may be replaced with the crew of a $24^{th}$ century spacecraft. Actions and decisions that are made by the participants cause changes in the simulated environment, ultimately causing the system to adapt the storyline as described herein above in ways to achieve certain pedagogical or dramatic goals.

In the military example, one of the participants may play the role of the Battle Captain, who runs the operation of the TOC and ensures proper flow of information into, within and out of the TOC. The Battle Captain tracks the missions that are underway, tracks the activities of friendly and enemy forces, and reacts appropriately to unforeseen events. Thus, the following goals, among many others, may be set up as the Battle Captain's goal hierarchy: (i) assist the commanding officer, (ii) assist in unit planning, (iii) set the conditions for the success of the brigade, and (iv) ensure that information flows in the TOC. Each of these goals may have one or more sub-goals, such as (i.a) provide advice and recommendations to the commanding officer, (ii.a) assist in developing troop-leading procedures, (iii.a) synchronize the efforts of the brigade staff, and (iv.a) repeatedly monitor radios, aviation reports, and activities of friendly units. Each of these sub-goals may have one or more further sub-goals, and so on.

Next, by combining the goal hierarchy with evidence from actual military documents, a plan may be devised that hypothesizes the expected plan of a Battle Captain for a typical 12-hour shift. For example: (i) arrive at the TOC, (ii) participate in battle update activity, (iii) collaboratively schedule first staff huddle for current staff; (iv) collaboratively schedule battle update activity for next shift, (v) begin monitoring for triggered sub-plans, (vi) begin the execution of repetitive sub-plans, (vii) terminate execution of repetitive sub-plans, (viii) participate in scheduled battle update activity, (ix) terminate execution of triggered sub-plans, and (x) leave the TOC.

Next in the example, a staff battle plan is identified for responding to battle drills. These plans are the military's tool for quickly responding to unforeseen or time-critical situations. For example, the system may simulate an unforeseen communications loss with a subordinate unit, necessitating a quick response from the Battle Captain. Identifying which staff battle drills are appropriate in any given task model generally depends on the storylines that are created for each simulation.

Task models such as these may be authored at varying levels of detail and formality, depending on the specific needs that they will serve. The content of a task model 22 preferably comes from doctrinal publications and military training manuals, but also preferably includes assumptions or tacit knowledge obtained from known military stories and anecdotes. Scenarios and elements thereof may also be developed by artists and other creative people with skill in dramatic writing and storytelling, such as screenplay writers and movie makers.

Continuing with the Battle Captain example, after an unforeseen loss of communications with a subordinate unit, it may be expected that the Battle Captain first checks recent activities and locations of enemy troops and then sends a second unit towards the location of the first unit. If, however, the Battle Captain fails to check the activities and locations of enemy troops before deploying the second unit, the experience manager 40 generates an alert that the participant playing the Battle Captain is not acting as expected and sends the alert to the instructor interface 50 along with suggested responses for the instructor, such as "Employ coach to advise Battle Captain." The instructor may then accept or reject the experience manager's 40 recommendation, depending on the instructor's desire to set the simulation back on track, to plot out a new direction for the simulation, or simply to teach the participant a valuable lesson.

As discussed, a specific media event 100 may contain a separate simulation event record 102 for each participant, and different participants may utilize different layouts for the media in their interface. For example, while the media delivered to a participant acting as a radar sector operator would be the same as the media delivered to a participant acting as a brigade commander, their access and presentation of that media would differ. Also, some media may be treated differently on different participants' interfaces. For example, an updated inventory of aircraft would be of great importance to an aviation officer but would be of passing interest to an intelligence officer. The notice may be visually highlighted in the aviation officer's interface through an alert. As such, the information related to the event will have to contain not only a layout identifier for the media, but also qualities for different participants in the story that effect the presentational rules for the media. Also, the media may differ from participant to participant. The intelligence officer may receive an audio file of a conversation while the aviation officer may only have access to a text manuscript of the file. On the other hand, the intelligence officer may have a simulated radio communication alert him that an active communication is taking place and force him to listen to it, while the aviation officer may gain access to the file only by navigating a series of menus that present the audio file in the context of the message. While the media file is the same, the display, presentation and impact on the participants differ greatly.

The designers of the simulation may anticipate many kinds of variations from the normal progress of the story. These variations can be pre-produced in traditional media forms and exist in the content database 34 for future use in the event that they are called for by the participant performance. The diagram of the use of these kinds of media and the new direction in which they take the story correspond to traditional branching storylines that have been used in interactive lessons in the past. These options are preferably presented to the instructor on the instructor interface 50 before they are used in the simulation, although the experience manager 40, as an artificial intelligence engine, may be programmed to deploy the elements as needed. Moreover, the instructor has the capability to edit many of the pre-produced options.

Other options, such as the use of the synthetic characters 60 as coaches, are not pre-produced but can be generated by the system or the instructor on the spot. The synthetic character engine has the capability to select an appropriate response to the participant action and create that response in real time. However, the original response is preferably presented to the instructor in the instructor interface 50 so that it can be approved and/or edited by the instructor before it is implemented. Once the response is created and approved, the experience manager 40 sends it to the story execution system 30. Approved options are converted by the experience manager 40 into media event records and inserted into the content database 34.

The automated coaching system 70 contains sufficient artificial intelligence to understand the performance of the participants and judge whether it is correct or incorrect. It can then automatically and immediately articulate advice, examples or criticism to the participants that will help tutor them and guide them to the correct performance according to the pedagogical goals of the exercise. Because the simulation is story-based, the synthetic character 60 that delivers the advice to the participant can play the role of one of the characters in the story. As such, the character will display the personality and style of the character as it imparts information to the appropriate participant. As with the experience manager 40, the artificial intelligence of the automated coaching system 70 may be rule-based. In another preferred embodiment, the artificial intelligence may be knowledge-based.

Figure 6:
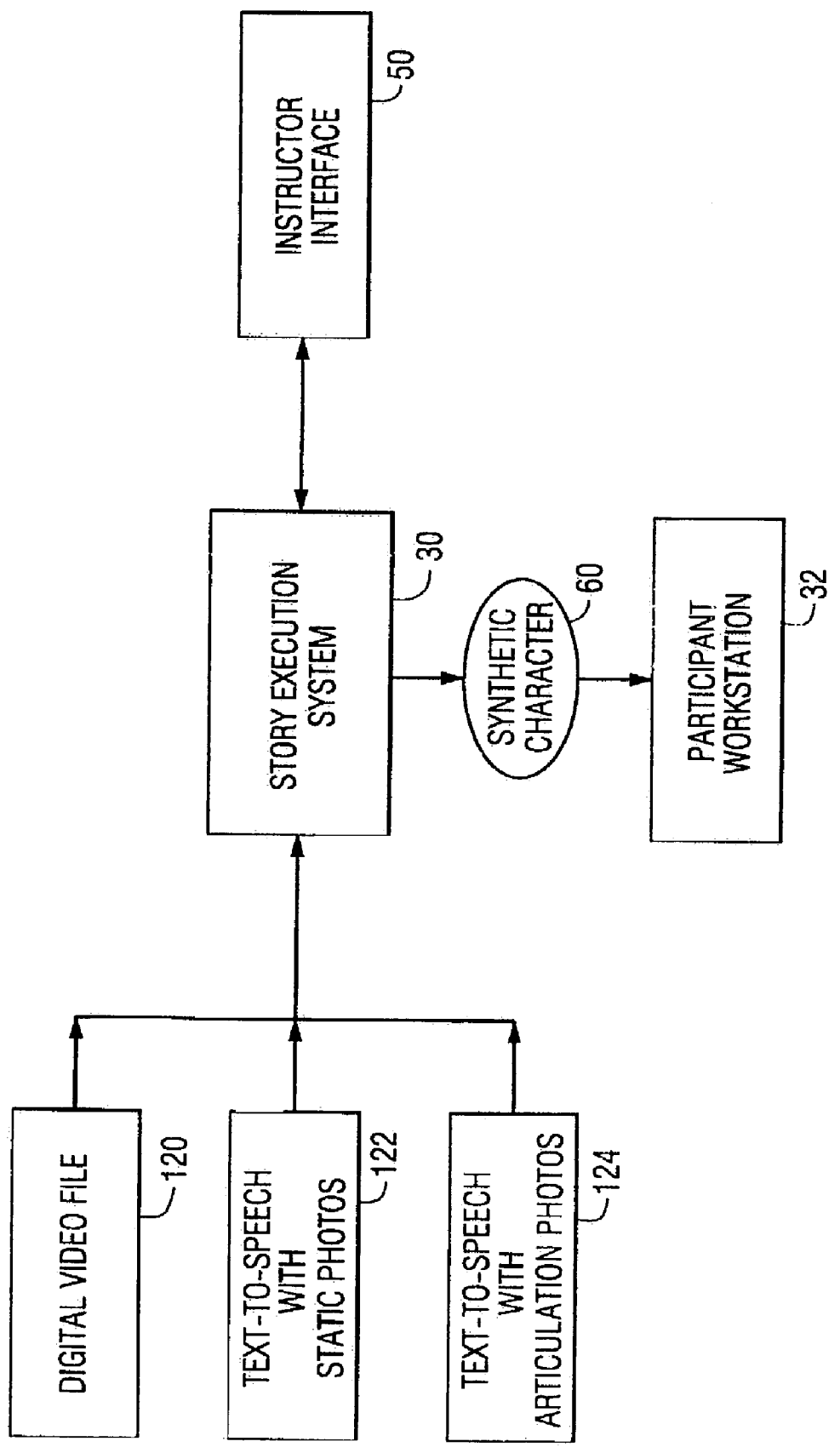
FIG. 6 is a diagram of synthetic character generation for a presently-preferred embodiment.

Turning to FIG. 6, once the decision has been made by the system and the instructor to deploy a synthetic character 60 with a specific statement, the story execution system 30 displays a media item on the participants' screens that portrays the synthetic character 60 saying the words. Preferably, this media item has both audio and visual components that cause the participants to believe that the character is a real human being that was participating in the simulation from an off-site location and using the same video-conferencing tools that are available to the participants.

The most believable media that could be presented to the participants is a pre-produced digital video file 120, capturing an actor delivering a pre-determined speech. Special effects may be added to the video file to simulate the effects of latency caused by such things as video-conferencing over the Internet, among other factors. Alternatively, an algorithm could be created to transform textual input into audio output by voice synthesis, while accompanying a static photograph 122 of the speaking character. This enables the instructor to tailor the communications to the particular participants as necessary. As a further alternative, the synthetic text-to-speech algorithm could be used with articulation photographs 124 (i.e., photographs of actors articulating specific vowel and consonant sounds) or animated character models.

Although the invention has been described in terms of particular embodiments in an application, one of ordinary skill in the art, in light of the teachings herein, can generate additional embodiments and modifications without departing from the spirit of, or exceeding the scope of, the claimed invention. Nothing in the above description is meant to limit the present invention to any specific materials, geometry, or orientation of elements. Many part/orientation substitutions are contemplated within the scope of the present invention and will be apparent to those skilled in the art. Accordingly, it is understood that the drawings, descriptions and examples herein are proffered only to facilitate comprehension of the invention and should not be construed to limit the scope thereof.

What is claimed is:

1. A method of training, comprising the steps of:

creating a general storyline;

generating media events that represent simulated events, wherein said simulated events are capable of being used within said general storyline;

accepting a set of input from a plurality of users, wherein said users experience a sequential series of events;

determining if said set of input causes a deviation from said general storyline;

generating by an algorithm a ranked list of potential accommodations to said general storyline to correct said deviation;

selecting an accommodation from said ranked list of potential accommodations;

associating at least one media event with said accommodation; and presenting said at least one media event to at least one of said plurality of users, wherein said presenting occurs on a computer or over a computer network.

2. The method of claim 1, wherein said sequential series of events is not fixed at the beginning of said training.

3. The method of claim 2, wherein said machine learning algorithm is selected from the group consisting of Bayesian learning algorithm and parallel distributed learning algorithm.

4. The method of claim 1, wherein said general storyline is moderately branched.

5. The method of claim 1, wherein said media events are selected from the group consisting of images, text messages, audio recordings, and movie recordings.

6. The method of claim 1, wherein said determining step further comprises the step of comparing said set of input to a representation of an expected experience of said plurality of users.

7. The method of claim 1, wherein said set of input includes text-based input, graphically-selected input, video-based input, and audio-based input.

8. The method of claim 1, wherein said ranked list of potential accommodations is ordered based on maintaining narrative continuity within said general storyline.

9. The method of claim 1, wherein said algorithm is a machine learning algorithm.

* * * * *